United States Patent [19]
Okuyama et al.

[11] Patent Number: 5,633,846
[45] Date of Patent: May 27, 1997

[54] POSITIONING DEVICE FOR OPTICAL DISC APPARATUS

[75] Inventors: Atsushi Okuyama; Takashi Yoshida, both of Ibaraki-ken; Fujio Tajima, Tsuchiura; Masamichi Ito; Yasuhiro Mii, both of Ibaraki-ken; Masato Soma; Hidehito Yamada, both of Takasaki, all of Japan

[73] Assignee: Hitachi, Ltd., Tokyo, Japan

[21] Appl. No.: 595,218

[22] Filed: Feb. 1, 1996

[30] Foreign Application Priority Data

Feb. 9, 1995 [JP] Japan ..................... 7-021739

[51] Int. Cl.⁶ ..................................................... G11B 7/09
[52] U.S. Cl. ..................... 369/44.34; 369/44.35; 369/106; 369/124
[58] Field of Search ..................... 369/44.34, 44.35, 369/44.36, 44.41, 44.29, 124, 106

[56] References Cited

U.S. PATENT DOCUMENTS

| | | |
|---|---|---|
| 4,748,609 | 5/1988 | Yonezawa et al. ............. 369/44.34 |
| 4,775,966 | 10/1988 | Miura et al. ................... 369/44.34 |
| 5,247,502 | 9/1993 | Sato ............................. 369/44.34 |
| 5,375,108 | 12/1994 | Suzuki ........................... 369/44.34 |
| 5,452,275 | 9/1995 | Ogawa ........................... 369/44.35 |
| 5,475,663 | 12/1995 | Ogino ............................ 369/44.35 |

FOREIGN PATENT DOCUMENTS 0203390  7/1994  Japan .

Primary Examiner—Thang V. Tran
Attorney, Agent, or Firm—Antonelli, Terry, Stout & Kraus, LLP

[57] ABSTRACT

A positioning system of an optical disc apparatus includes focus error detecting part for detecting a focus error signal as a focal shift of a light spot related to an information recording surface of an optical disc, light spot moving part in the direction intersecting substantially perpendicularly to the optical disc surface, first digital arithmetic part for receiving the focus error signal and outputting a first control signal, second digital arithmetic part for receiving the focus error signal and a specified third control signal, performing arithmetic operations of a disturbance observer and outputting a second control signal, adding circuit for adding the first control signal and the second control signal and outputting the third control signal, drive circuit for driving the light spot moving part in a direction intersecting perpendicularly to the disc surface by the third control signal, wherein the first and the second digital arithmetic circuit perform arithmetic operations at different sampling periods.

20 Claims, 12 Drawing Sheets

POSITIONING DEVICE FOR OPTICAL DISC APPARATUS

BACKGROUND OF THE INVENTION

The present invention relates to an optical disc apparatus used, for example, as external memory means of a computer, and more particularly to a positioning system of an optical disc apparatus for adequately positioning a light spot relative to an information recording surface of an optical disc.

An example of this type of a positioning control system of a conventional optical disc apparatus is disclosed in JP-A-6-203390. In this prior art, the focus servo system and the tracking servo system are configured so that arithmetic operations for control are divided and executed by two separate circuits, that is, an analog circuit is used to execute those operations requiring high speed processing are performed by and a digital circuit is used to execute those operations which are complicated but may be processed at low speed.

Generally, there is a shift of the center of a focus error signal and a tracking error signal from the electrical center of a drive signal owing to a shift of the optical axis of an objective lens and an electrical offset of an amplifier, for example. To eliminate this shift, it is required to make a correction to bring the center of the focus error signal and the tracking error signal into coincidence with the electrical center of the drive signal.

With regard to the above-mentioned elimination of the shift, heretofore a method has been used in which a value corresponding to an amount of shift from the electrical center of the drive signal is obtained empirically, and the obtained value is added to the drive signal.

In the positioning system of the conventional optical disc apparatus mentioned above, to respond to the strong demand for a functional improvement of the servo system, introducing digital control is effective indeed. In parallel with this demand, there has been a growing demand for speeding up of data transmission and it has become necessary to increase the rotation speed of the optical disc. Under this situation, a problem has arisen as described below.

As the optical disc is rotated at higher speed, the frequencies of disturbances such as vertical deflection and eccentricity of disc surface in synchronism with the rotation of the optical disc will increase. In other words, it is necessary to provide notably improved disturbance suppression characteristics.

As a conventional technique to increase the disturbance suppression characteristics, there is a method in which arithmetic means requiring stability is formed as an analog circuit, and arithmetic means to obtain greater gain at low frequencies is formed as a digital circuit, and the coefficient of the digital arithmetic means is set at an optimum value according to the control condition.

However, in a conventional servo system in which the arithmetic means required to have stability is formed by an analog circuit as mentioned above, when the gain of an actuator or the like differs from a standard value due to an individual difference of the apparatus, it is necessary to make adjustment to secure stability.

Further, in order to set a coefficient of the digital arithmetic means according to the control condition, a large memory is required to store a plurality of coefficients. In addition, the coexistence of an analog circuit and a digital circuit makes the circuit configuration large and complicated.

On the other hand, in the prior art mentioned above, in the method of correcting the shift of the center of the focus error signal and the tracking error signal from the electrical center of the drive signal, a value corresponding to the amount of shift from the electrical center of the drive signal is obtained empirically, and the obtained value is added to the drive signal. In this method, however, if a shift occurs due to an individual difference of the apparatus, adjustment is required.

SUMMARY OF THE INVENTION

The present invention has as its object to realize automation of adjustment of the positioning servo system of the optical disc apparatus and provide a positioning system of an optical disc apparatus having improved disturbance suppression characteristics.

The positioning system of the optical disc apparatus according to present invention comprises:

focus error detecting means for detecting a focus error signal as a focal shift of a light spot relative to an information recording surface of an optical disc;

means for moving the light spot in the direction intersecting substantially perpendicularly to the optical disc surface;

first arithmetic means for receiving the focus error signal and outputting a first control signal;

second arithmetic means for receiving the focus error signal and a third control signal and outputting a second control signal;

adding means for adding the first control signal and the second control signal and outputting the third control signal; and drive means for driving the light spot moving means in the direction intersecting perpendicularly to the disc surface by the third control signal, wherein the first and the second arithmetic means and the adding means are formed as digital circuits, and the second arithmetic means performs operations of a disturbance observer.

In the positioning system of the optical disc apparatus according to the present invention, the first and the second arithmetic means preferably perform arithmetic operations respectively at different sampling periods.

Further, in the positioning system of the optical disc apparatus according to the present invention, the sampling period of the second arithmetic means is preferably longer than the sampling period of the first arithmetic means.

Further, in the positioning system of the optical disc apparatus according to the present invention, the sampling period of the second arithmetic means is preferably integer multiples of the sampling period of the first arithmetic means.

Further, in the positioning system of the optical disc apparatus according to the present invention, the second arithmetic means preferably is formed by a combination of a low-pass filter and a high-pass filter.

In another embodiment, the positioning system of the optical disc apparatus according to the present invention comprises tracking error detection means for detecting a tracking error signal as an off-track error of the light spot tracing the track on the optical disc; light spot radially moving means for moving the light spot substantially in the radial direction of the optical disc; fourth arithmetic means for receiving the tracking error signal and outputting a fourth control signal; fifth arithmetic means for receiving the tracking error signal and a sixth control signal and outputting a fifth control signal; adding means for adding the fourth control signal and the fifth control signal and the sixth control signal; seventh arithmetic means for receiving the sixth control signal and outputting a seventh control signal; and radially drive means for driving the light spot radially moving means by the sixth control signal and the seventh control signal, wherein the fourth arithmetic means, the fifth arithmetic means, the seventh arithmetic means and the adding means are formed as digital circuits, and wherein the fifth arithmetic means performs operations of a disturbance observer.

Further, in the positioning system of the optical disc apparatus according to the present invention, the fourth and the fifth arithmetic means preferably perform arithmetic operations respectively at different sampling periods.

Further, in the positioning system of the optical disc apparatus according to the present invention, the sampling period of the fifth arithmetic means is preferably longer than the sampling period of the fourth arithmetic means.

Further, in the positioning system of the optical disc apparatus according to the present invention, the sampling period of the fifth arithmetic means is preferably integer multiples of the sampling period of the fourth arithmetic means.

Further, in the positioning system of the optical disc apparatus according to the present invention, the fifth arithmetic means is formed by a combination of a low-pass filter and a high-pass filter.

In yet another embodiment, the positioning system of the optical disc apparatus according to the present invention comprises focus error detection means and tracking error detection means for respectively detecting a focus error signal as a focal shift of a light spot relative to an information recording surface of an optical disc and an off-track error of the light spot tracing the track on the optical disc; light spot moving means for moving the light spot in the direction intersecting perpendicularly to the optical disc surface and light spot radially moving means for moving the light spot substantially in the radial direction of the optical disc surface; first arithmetic means for receiving the focus error signal and outputting a first control signal; second arithmetic means for receiving the focus error signal and a third control signal and outputting a second control signal; first adding means for adding the first control signal and the second control signal and outputting the third control signal; drive means for driving the light spot moving means in the direction intersecting perpendicularly to the disc surface by the third control signal; fourth arithmetic means for receiving the tracking error signal and outputting a fourth control signal; fifth arithmetic means for receiving the tracking error signal and a sixth control signal and outputting a fifth control signal; second adding means for adding the fourth control signal and the fifth control signal and outputting the sixth control signal; seventh arithmetic means for receiving the sixth control signal and outputting a seventh control signal; and radially driving means for driving the light spot radially moving means by the sixth control signal and the seventh control signal, wherein the first, second, fourth, fifth and seventh arithmetic means and the first and second adding means are formed as digital circuits, and the second and fifth arithmetic means respectively perform operations of a disturbance observer.

Further, in the positioning system of the optical disc apparatus according to the present invention, preferably, the first and second arithmetic means perform arithmetic operations respectively at different sampling periods, and the fourth and fifth arithmetic means perform arithmetic operations at different sampling periods.

Further, in the positioning system of the optical disc apparatus according to the present invention, preferably, the sampling period of the second arithmetic means is longer than the sampling period of the first arithmetic means, and the sampling period of the fifth arithmetic means is longer than the sampling period of the fourth arithmetic means.

Further, in the positioning system of the optical disc apparatus according to the present invention, preferably, the sampling period of the second arithmetic means is integer multiples of the sampling period of the first arithmetic means, and the sampling period of the fifth arithmetic means is integer multiples of the sampling period of the fourth arithmetic means.

Further, in the positioning system of the optical disc apparatus according to the present invention, preferably, the second and fifth arithmetic means each comprise a combination of a low-pass filter and a high-pass filter.

Further, in the positioning system of the optical disc apparatus according to the present invention, the sampling frequency of each digital circuit is preferably integer multiples or one divided by an integer of the sampling frequency of the optical disc apparatus.

Further, in the positioning system of the optical disc apparatus according to the present invention, the sampling frequency of each digital circuit is preferably integer multiples or one divided by an integer of 44.1 kHz.

Further, in the positioning system of the optical disc apparatus according to the present invention, the digital circuits are preferably integrated into one circuit.

Further, in the positioning system of the optical disc apparatus according to the present invention, the digital circuits are preferably formed by an IC chip.

Further, in the positioning system of the optical disc apparatus according to the present invention, the area of the IC chip is preferably seven square millimeters or less.

In the focus servo system in the positioning system of this optical disc apparatus, the second arithmetic means is formed by a disturbance observer which estimates disturbances such as vertical deflection and eccentricity of disc surface, and the second control signal representing the estimated disturbance is added to the first control signal. Furthermore, those arithmetic means are formed as digital circuits, and because the frequencies of disc surface vertical deflection and eccentricity are low, the second arithmetic means performs arithmetic operations at a sampling period same as or lower than that of the first arithmetic means.

Therefore, it is possible to reduce the size of the circuit configuration, obtain considerable disturbance suppression characteristics for high speed data transmission, and achieve automated adjustment of the focus servo system.

Meanwhile, in the tracking servo system in the positioning system of the optical disc apparatus, the fifth arithmetic means is formed by a disturbance observer for estimation of disturbances such as vertical deflection and eccentricity of disc surface, and the fifth control signal representing the estimated disturbance is added to the fourth control signal. Furthermore, those arithmetic means are formed as digital circuits, and in view of the fact that the disc surface vertical deflection and eccentricity have low frequencies, the fifth arithmetic means as the disturbance observer is made to perform operations at a sampling frequency same as or lower than that of the fourth arithmetic means.

Then, it becomes possible to achieve the size reduction of the circuit configuration, the improved disturbance suppression characteristics for high speed data transmission and the automated adjustment of the tracking servo system.

In addition, by using a sampling frequency which is integer multiples of or one divided by an integer of the sampling frequency of the optical disc apparatus, it becomes possible to use a single standard clock for the optical disc apparatus, so that the circuit can be simplified.

DESCRIPTION OF THE PREFERRED EMBODIMENTS

Embodiments of the present invention will be described with reference to the accompanying drawings.

Figure 1:
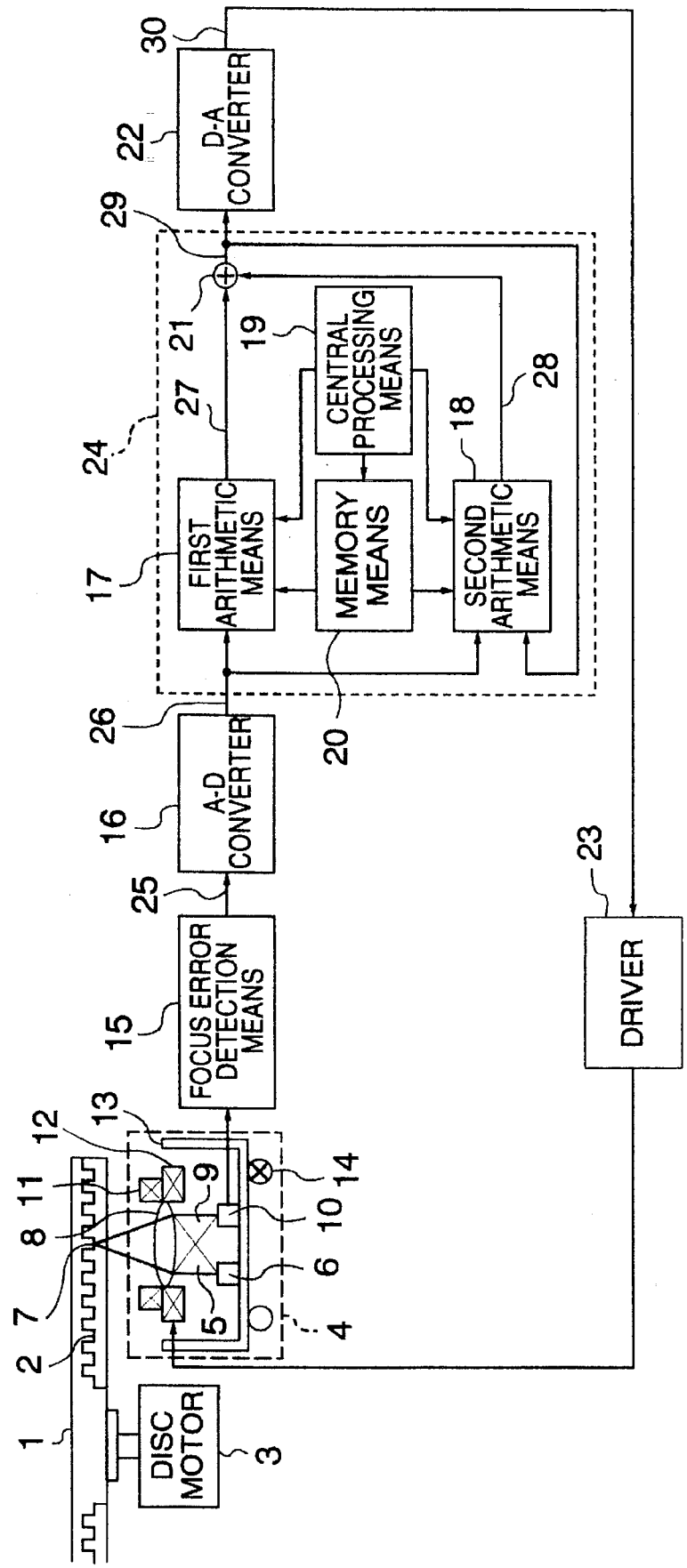
FIG. 1 is a block diagram showing the positioning system of the optical disc apparatus according to an embodiment of the present invention.

FIG. 1 is a schematic block diagram showing a positioning system of an optical disc apparatus according to a first embodiment of the present invention. The positioning system of the optical disc apparatus chiefly comprises a focus error detection means 15 for detecting a focus error signal 25 as a focal shift of a light spot 7 relative to an information recording surface of an optical disc 1; a focus actuator 11, also called light spot moving means to move the light spot 7 in the direction intersecting substantially perpendicularly to the surface of the optical disc 1, for driving an objective lens in the direction intersecting substantially perpendicularly to the disc surface; first arithmetic means 17 for receiving a digitized focus error signal 26 and outputting a first control signal 27; second arithmetic means 18 for receiving the focus error signal 26 and a third control signal 29 and outputting a second control signal 28; adding means 21 for adding the first control signal 27 and the second control signal 28 and outputting a third control signal 29; and a driver 23 also called drive means for driving the focus actuator 11 in the direction intersecting perpendicularly to the disc surface by the third control signal.

The first arithmetic means 17, the second arithmetic means 18 and adding means 21 are formed as digital circuits.

The first arithmetic means 17, the second arithmetic means 18, the adding means 21, a central processing unit 19 and memory means 20 constitute a digital signal processing section 24.

Description of the positioning system of the optical disc apparatus will now enter into greater details. In the optical disc 1, a track 2 is formed in a spiral 1 to 2 μm wide in the circumferential direction. A disc motor 3 drives the optical disc 1 to rotate, which is chucked to the top of the motor.

A pickup 4 includes a semiconductor laser 6 to emit a laser light 5, an objective lens 8 to focus the laser light to form a light spot 7 on a track 2, a sensor 10 to detect a position signal of the light spot 7 and a data signal from a reflected light 9 from the track 2, a focus actuator 11 to drive the objective lens in the direction intersecting perpendicularly to the disc surface and a tracking actuator 12 to drive the objective lens in a substantially radial direction, a sled 13 to accommodate and move those components, and a linear actuator 14 for driving the optical disc 1 in the radial direction to move the light spot 7 over tracks 2.

An A-D converter 16 converts an analog output signal of the focus error detection means 15 into a digital signal and outputs the digital signal to the first arithmetic means 17 and the second arithmetic means 18. The first arithmetic means 17 performs operations at a sampling period T1, while the second arithmetic means 18 performs operations with a sampling period $T_2$.

The central processing unit 19 directs each arithmetic means to execute operation and controls the operation of the memory means 20. The memory means 20 stores control arithmetic operation routines in the form of software. A D-A converter 22 converts a digital output signal of the adding means 21 into an analog signal and outputs the analog signal to the driver 23.

The operation of the positioning system of the optical disc apparatus will next be described. The optical disc 1 is rotated by the disc motor 3 in such a way that the linear velocity is constant. The focus error detection means 15 detects a focus error signal 25 which represents a focal shift of the light spot relative to the track 2 on the oxtail disc 1. This focal error signal 25 is input to the A-D converter 16, where this signal is converted from an analog signal into a digital signal and this digital error signal 26 is output from the A-D converter 16.

This focus error signal 26 is input to the first and second arithmetic means 17 and 18. By a command from the central processing means 19, the first arithmetic means 17 has software read thereinto from the memory means 20 and also receives a focus error signal 26 at every sampling period $T_1$, and performs a phase compensation operation such as phase-lead-lag compensation or a state feedback compensation operation involving a state estimator, and outputs the result of operation as a first control signal 27. This first control signal 27 is input to the adding means 21.

When receiving a command from the central processing means 19, the second arithmetic means 18 has software read thereinto from the memory means 20, and receives a focus error signal 26 and a third control signal 29 at every sampling period $T_2$, and performs arithmetic operations of a disturbance observer formed by a state estimator, and outputs the result of calculation as a second control signal 28. The second control signal 28 is input to the adding means 21.

A second control signal 27 and a second control signal 28 are input to the adding means 21 where those signals are added together, and the result is output as a third control signal 29. This third control signal 29 is input to the second arithmetic means 18 and also to the D-A converter 22.

The D-A converter 22 receives a third control signal 29, converts this digital signal into an analog form, and outputs a third control signal 30. The third control signal 30 is input to the driver 23. In response to the third control signal 30, the driver 23 drives the focus actuator 11 to move the objective lens 8 in the direction intersecting perpendicularly to the disc surface, and the pickup is positioned such that the track 2 of the optical disc 1 is within the focal depth of the objective lens 8.

Description will move on to the first arithmetic means 17. The first arithmetic means 17 can be realized by state feedback compensation involving a state estimator, but phase-lead-lag-compensation is used in this embodiment. In this case, the discrete-time transfer function of the first arithmetic means 17 is expressed below as Eq. 1.

$$C_1(z) = K_c \cdot \frac{b_1 + b_2 z^{-1} + b_3 z^{-2}}{1 + a_2 z^{-1} + a_3 z^{-2}} \quad (1)$$

where the minus first power of z denotes one sample delay, $a_2$, $a_3$, $b_1$, $b_2$, $b_3$ denote coefficients representing frequency characteristics of the first arithmetic means 17, and $K_c$ denotes a loop gain of the first arithmetic means 17.

A focus error signal 26 is input to the first arithmetic means 17 at every sampling period $T_1$, the first arithmetic means 17 outputs a first control signal 27 as the result of digital compensation operation. In the following description, the focus error signal 26 is designated by e(k) and the first control signal 27 is designated by $U_1(k)$ in which k denotes time index of each digital sample. An output equation to obtain a first control signal $U_1(k)$ from a focus error signal e(k) is shown below as Eq. 2.

$$\left. \begin{array}{l} W_3(k) = b_1 \cdot e(k) + W_1(k) \\ U_1(k) = K_c \cdot W_3(k) \end{array} \right\} \quad (2)$$

By the above Eq. 2, the first control signal $U_1(k)$ is obtained, but in order to obtain $U_1(k)$ with the next sample, too, a state variable is calculated by Eq. 3 shown below.

$$W_1(k+1) = W_2(k) + b_2 \cdot e(k) - a_2 \cdot W_3(k) W_2(k+1) = b_3 e(k) - a_3 \cdot W_3(k) \quad (3)$$

Then, the second arithmetic means will be described. The second arithmetic means 18 receives a focus error signal 26 and a third control signal 29 and outputs a second control signal 28 at every sampling period $T_2$. In the following description, the second control signal 28 is designated by $U_2(k)$ and the third control signal 29 is designated by $U_3(k)$. An output equation to obtain a second control signal $U_2(k)$ from a focus error signal e(k) is shown below as Eq. 4.

$$\left. \begin{array}{l} \hat{e}(k) = K_2 \cdot \hat{x}_1(k) \\ \epsilon(k) = -e(k) - \hat{e}(k) \\ U_2(k) = -H \cdot \epsilon(k) \end{array} \right\} \quad (4)$$

where H denotes gain to cancel disturbance under a steady condition, and is expressed by Eq. 5 as follows.

$$H = \frac{M \cdot L_2}{K_1 \cdot T_2} \quad (5)$$

where $K_1$ denotes a d.c. gain obtained by multiplying a d.c. gain of the driver 23 by a d.c. gain of the focus actuator 11, $K_2$ denotes gain of the focus error detection means 15, and $L_2$ denotes a feedback gain of the second arithmetic means 18 to be described later. For the next sample, a state equation shown below as Eq. 6 is calculated.

$$\hat{x}_1(k+1) = \hat{x}_1(k) + T_2 \cdot \hat{x}_2(x) + \frac{K_1 \cdot T_2^2}{2M} \cdot U_3(k) + L_1 \cdot \epsilon(k) \quad (6)$$

$$\hat{x}_2(k+1) = \hat{x}_2(k) + \frac{K_1 \cdot T_2}{M} \cdot U_3(k) + L_2 \cdot \epsilon(k)$$

where M denotes the mass of a movable portion of the actuator, $L_1$ and $L_2$ denote feedback gains to determine the velocity of convergence of disturbance estimation, and the second control signal $U_2(k)$ which is output is held during a sampling period $T_2$.

Meanwhile, the third control signal $U_3(k)$ is calculated by Eq. 7 as shown below.

$$U_3(k) = U_1(k) + U_2(k) \quad (7)$$

Figure 2:
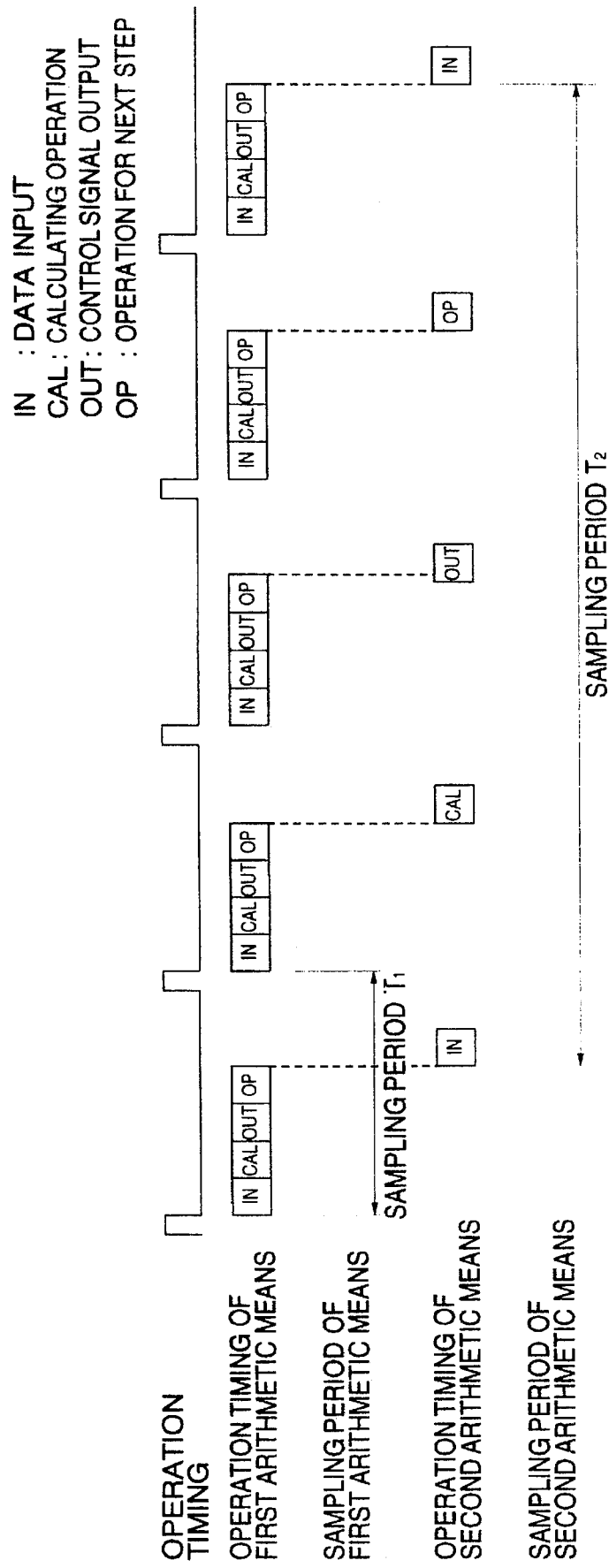
FIG. 2 is a timing chart showing operation timing of the positioning system of the optical disc apparatus shown in FIG. 1.

The operation routine described above will be explained with reference to a timing chart in FIG. 2 showing an example of the operation routines of the first arithmetic means 17 and the second arithmetic means 18.

The operations of the first arithmetic means 17 and the second arithmetic means 18 can be respectively divided into four blocks. The four blocks are data input, arithmetic operation, control signal output and operation for the next step. The first arithmetic means 17 executes those four operations as a series of steps according to operation timing pulses produced by the central processing means 19.

In contrast, the second arithmetic means 18 divides the above-mentioned four operations and executes one or an arbitrary number of the divided operations within the same operation timing after the first arithmetic means 17 has finished the operations. A second control signal is held by the adding means 21 after it is output until the next control signal 28 is output, and immediately after the first control signal 27 is calculated, the second control signal 28 is added.

Figure 3:
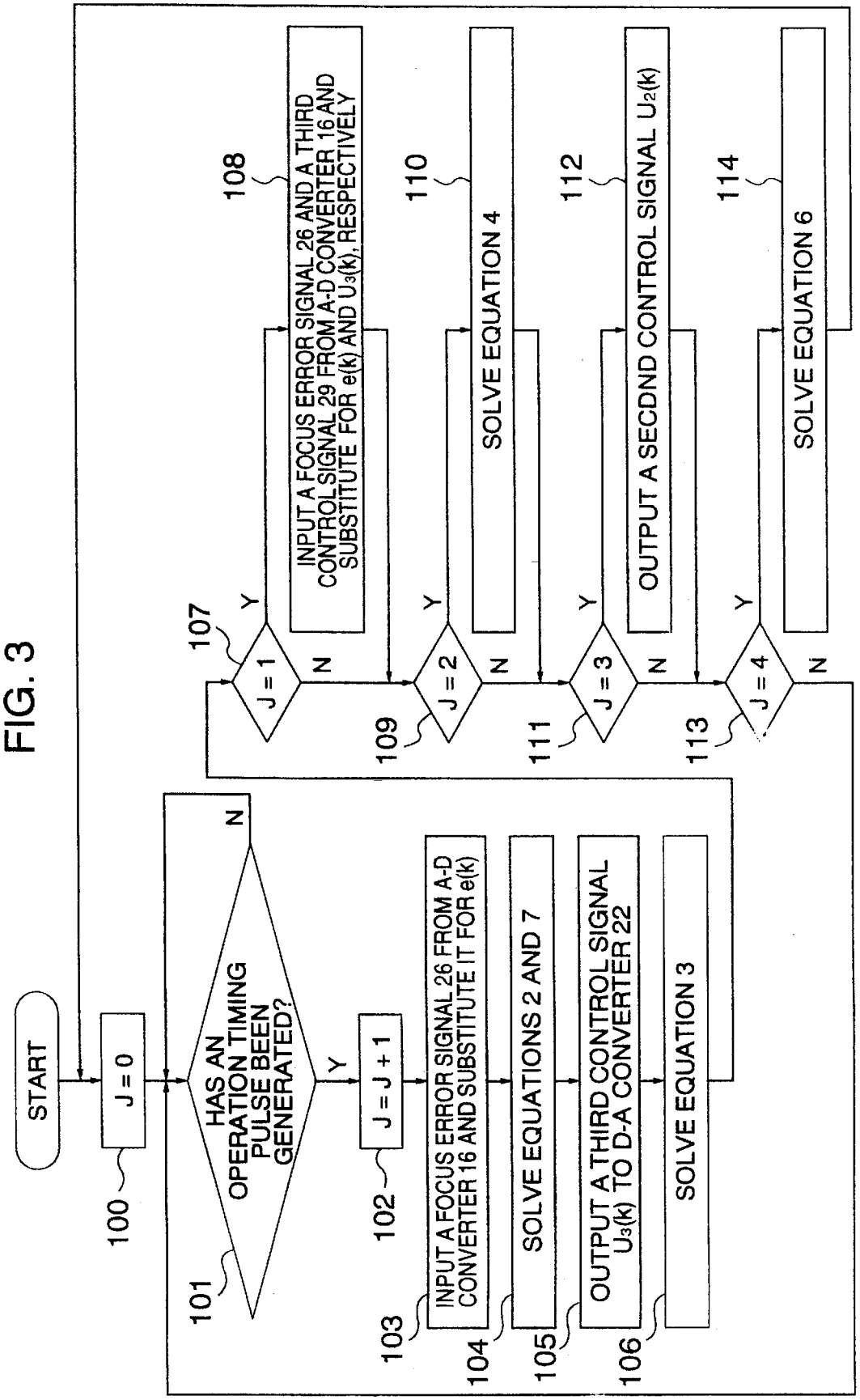
FIG. 3 is a flowchart showing an operation routine of the positioning system of the optical disc apparatus shown in FIG. 1.

The operation routine described above will be explained with reference to a flowchart in FIG. 3 showing an example of the operation routines of the first arithmetic means 17 and the second arithmetic means 18.

A decision is made whether or not an operation timing pulse has been generated by the central processing means 19 (S101). If an operation timing pulse has not been generated, the routine waits until an operation timing pulse is generated. If an operation timing pulse has been generated, a focus error signal 26 is input from the A-D converter 16 and substituted for e(k) (S103).

Then, Eqs. 2 and 7 as the output equations are calculated (S104), a third control signal $U_3(k)$ obtained as the result of calculation of Eq. 7 is outputted to the D-A converter 22 (S105). After this, for the next sample, Eq. 3 as a state equation is calculated (S106).

If J=1, a focus error signal 26 from the A-D converter 16 and a third control signal are input and and substituted for e(k) and $U_3$(S108), respectively, and the routine waits until an operation timing pulse is generated. If J=2, Eq. 4 as an output equation is calculated (S110), and the routine waits until an operation timing pulse is generated.

If J=3, a second control signal $U_2(k)$ as the result of calculation from Eq. 4 is output (S112), and the routine waits for an operation timing pulse to arrive. If j=4, Eq. 6 as a state equation is calculated for the next sample (S114), then the routine returns to step 100, and repeats the steps mentioned above.

With reference to FIG. 1, description will be made of a method of converting the sampling period of a digital signal by software. A analog focus error signal 25 is passed through a low-pass filter for eliminating liasing noise (not shown), and is converted by the A-D converter to a digital focus error signal 26 synchronized with the sampling period $T_1$ of the first arithmetic means 17. A third control signal 29 is a digital signal synchronized with the sampling period $T_1$. If the sampling period $T_2$ of the second arithmetic means 18 differs from the sampling period $T_1$ of the first arithmetic means 17, a focus error signal 26 and a third control signal 29 synchronized with the sampling period $T_1$ need to be converted to a digital signal synchronized with the sampling period $T_2$ of the second arithmetic means 18. If the sampling period $T_2$ is longer than the sampling period $T_1$, it is necessary to perform a thinning-out process which picks out a signal at every sampling period $T_2$ from the signal of the sampling period $T_1$. A thinning-out method in wide use in the area of digital signal processing may be performed. If the sampling period $T_2$ is shorter than the sampling period $T_1$, it is necessary to perform an interpolation process and an interpolation method in wide use in the area of digital signal processing may be used. When a digital second control signal synchronized with the sampling period $T_2$, which is the result of operation in the second arithmetic means 18 is added to the digital first control signal 27 synchronized with the sampling period $T_2$, if the sampling period $T_2$ is longer than the sampling period 1, the second control signal 28 needs to be held during the sampling period $T_2$. Or otherwise, an interpolation process is preferably performed. An interpolation method in wide use in digital signal processing may be used. If the sampling period $T_2$ is shorter than the sampling period $T_1$, it is necessary to perform a thinning-out process to pick out a signal at every sampling period $T_1$ from the signal of the sampling period $T_2$. A thinning-out method in wide use in digital signal processing may be used.

Figure 10:
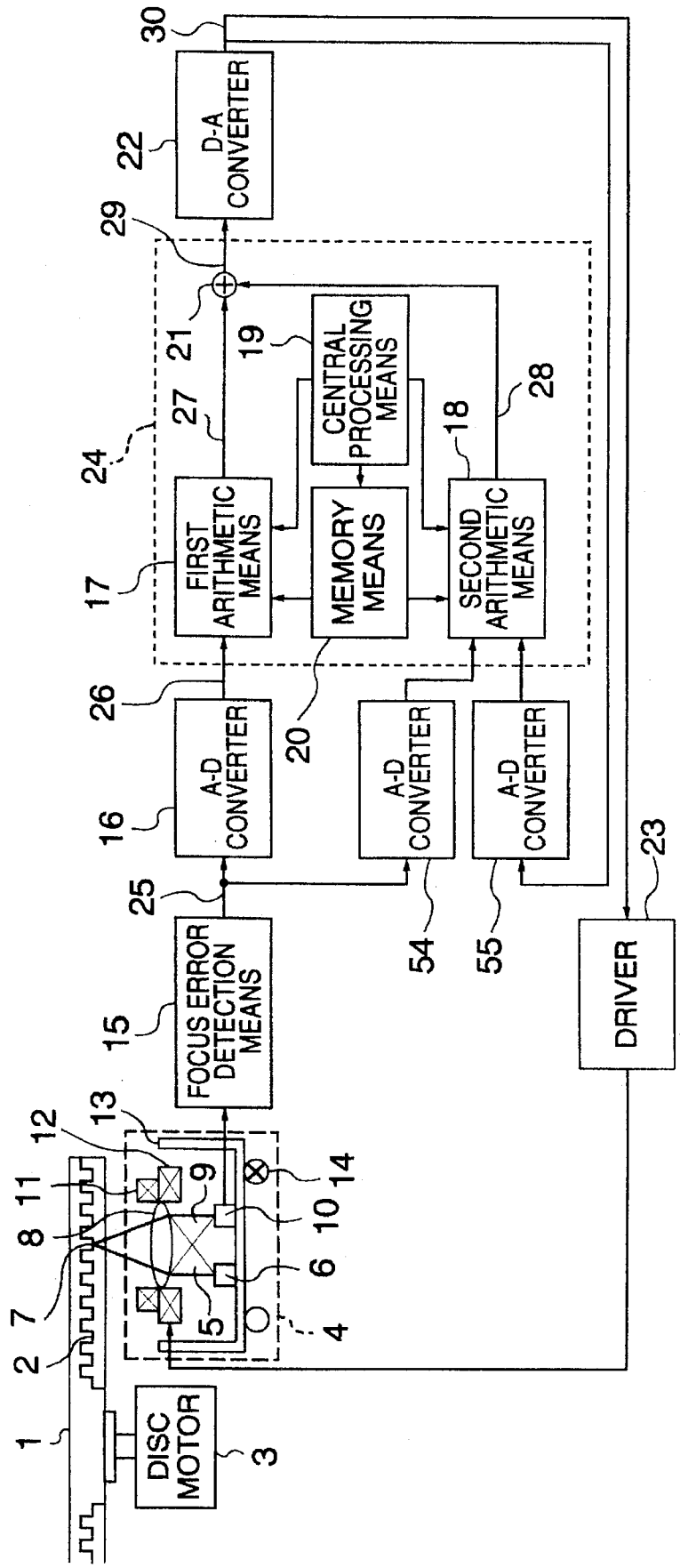
FIG. 10 is a block diagram showing another example of the present invention.

Referring to FIG. 10, description will be made of a method of converting the sampling period of a digital signal by hardware. Description will center around the portions different from the system configuration in FIG. 1. Reference numerals 54 and 55 denote A-D converters. How to convert a digital focus error signal 26 and a digital third control signal 29 synchronized with the sampling period $T_1$ to signals synchronized with the sampling period $T_2$ is as follows. With regard to the focus error signal, an analog focus error signal 25 is passed through a low-pass filter to eliminate liasing noise (not shown), and converted by the A-D converter 54 to a digital focus error signal. As for the digital third control signal 29 synchronized with the sampling period $T_1$, this third control signal 29 is converted once to an analog third control signal 30, and after passed through a low-pass filter to eliminate liasing noise (not shown), the analog third control signal 30 is converted by the A-D converter 55 to a digital signal synchronized with the sampling period $T_2$.

Figure 9:
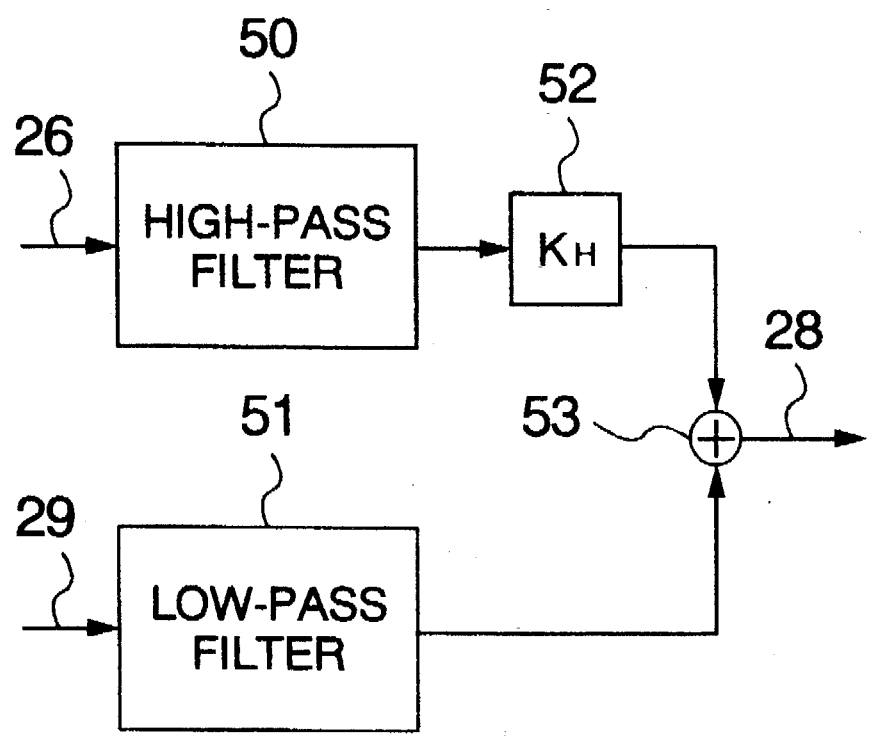
FIG. 9 is a block diagram showing an example of composition of the second arithmetic means in the positioning system of the optical disc apparatus.

The second arithmetic means 18 formed by a combination of a low-pass filter and a high-pass filter will be described with reference to a block diagram in FIG. 9. The second arithmetic means 18 includes a high-pass filter 50, a low-pass filter 51, gain 52 to cancel disturbances in the steady state, and an adder 53.

The high-pass filter 50 is expressed by the following Eq. 8.

$$H(z) = \frac{b_{H1} + b_{H2}z^{-1} + b_{H3}z^{-2}}{1 + a_{H2}z^{-1} + a_{H3}z^{-2}} \quad (8)$$

where $a_{H2}$, $a_{H3}$, $b_{H1}$, $b_{H2}$ and $b_{H3}$ are coefficients each representing frequency characteristics of the high-pass filter 50.

On the other hand, the low-pass filter 51 is expressed by the following Eq. 9.

$$L(z) = \frac{b_{L1} + b_{L2}z^{-1} + b_{L3}z^{-2}}{1 + a_{L2}z^{-1} + a_{L13}z^{-2}} \quad (9)$$

where $a_{L2}$, $a_{L3}$, $b_{L1}$, $b_{L2}$ and $b_{L3}$ are coefficients each representing frequency characteristics of the low-pass filter 51.

The gain 52 is expressed by Eq. 10 as follows.

$$K_H = \frac{\omega_D^2}{K_1 K_2} \quad (10)$$

where $\omega_D$ (rad/s) denotes the cutoff frequency of the high-pass filter 50 and the low-pass filter 51, in other words, gain to determine the velocity of convergence of disturbance estimation.

In this operation routine, the high-pass filter 50 and the low-pass filter 51 are divided into four blocks (state equations and output equations) of data input, arithmetic operation, control signal output, and a state equation and an output equation for arithmetic operations for the next step, and one or an arbitrary number of the divided operations are performed after completion of operations of the first arithmetic means 17 just like in the earlier-mentioned routine.

Figure 4:
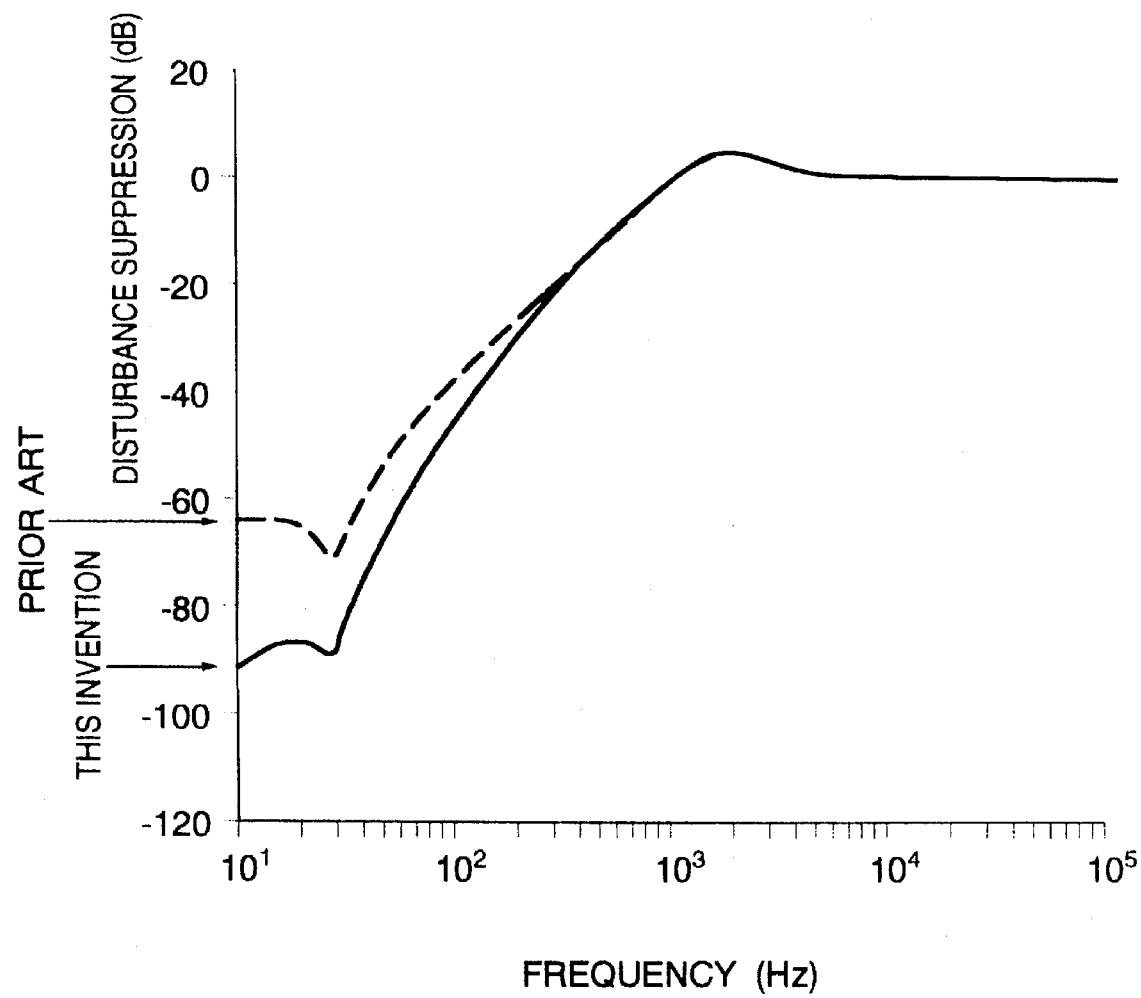
FIG. 4 is a frequency characteristics diagram of the positioning system of the optical disc apparatus shown in FIG. 1.

Effects of this embodiment will be described with reference to the frequency characteristics shown in FIG. 4. FIG. 4 is a frequency characteristics diagram for disturbance to be added to the focus error signal 25 until signal after it is added. The horizontal axis indicates values of frequencies and the vertical axis indicates values of disturbance suppression of the servo system. FIG. 4 shows that the disturbance suppression characteristics are higher for lower frequencies. The broken line shows the characteristics when the second control signal 28 is zero and corresponds to the characteristics of the prior art. On the other hand, the solid line shows the characteristics of the positioning system of the optical disc apparatus according to this embodiment.

The second arithmetic means 18 as a disturbance observer extracts a disturbance with a frequency within the estimation frequency band of the disturbance observer, and adds it to the first control signal to thereby eliminate effects of the disturbance. This method corresponds to inserting a high-pass filter in a path subjected to disturbances in the conventional control system.

For this reason, as shown in the frequency characteristics diagram in FIG. 4, the positioning system of the optical disc apparatus according to this embodiment exhibits higher disturbance suppression characteristics in a low frequency range than in the prior art system. Therefore, according to this embodiment, it is possible to suppress disturbances such as vertical deflection or eccentricity of disc surface to lower level than before. The shift of the center of the focus error signal from the electrical center of the drive signal can be regarded as a direct-current disturbance added to the electrical center of the drive signal and can be suppressed better than before. Moreover, a shift in the apparatus in use from an apparatus model included in the disturbance observer can be regarded as a disturbance and can be corrected.

In a wide-use device configuration having a compensator for stabilizing the control system and a low-frequency-range compensator for disturbance suppression arranged in series, there is a tradeoff relation between the stabilization of the control system and the disturbance suppression characteristics in a low-frequency range, and the disturbance suppression characteristics will be restricted if the configuration is designed with emphasis placed on stability. If the compensators are arranged in series and high disturbance suppression characteristics are to be obtained in a low-frequency range, the servo frequency band needs to be wide.

However, there is a limit to the use of a wide servo frequency band owing to the resonance point of a controlled object and noise, etc. The first arithmetic means 17 as the main compensator and the second arithmetic means 18 as the disturbance observer have distinctly different roles, that is, the former to stabilize the control system and the latter to suppress disturbance. For this reason, the two compensators can be designed independently of each other, and improved disturbance suppression characteristics can be obtained in a low-frequency range without using a wide servo frequency band.

For the main compensator, a compensator which suppresses disturbance need not be used, and therefore the main compensator circuit can be configured in a simple form. In digital compensators, the number of coefficient bits, for example, of the compensator is generally important for deciding control performance and circuit size. In this embodiment, however, a low-frequency-range compensator is not required for the main compensator, so that the number of bits for coefficients or the like can be smaller than in the prior art system.

Description will then be made of an example of the numbers of bits of the A-D and D-A converters, the number of operation bits, the sampling frequency, etc. of the positioning system of the optical disc apparatus according to this embodiment.

When digital circuits are formed on one IC chip, the numbers of bits of the A-D and D-A converters, and the coefficients of compensation elements, etc. are important factors determining the size of the IC chip. In this embodiment, the A-D converter and the D-A converter are of 8-bit type, and in the arithmetic operations by the first arithmetic means 17 and the second arithmetic means 18, the coefficients of the compensation elements are 8 bits long, 8 bits×8 bits are used for multiplications bits, 16 bits+16 bits are used for additions, and the memory is a 16-bit-address memory. By this arrangement, the IC chip size can be reduced.

As for the sampling frequency, the sampling frequency of the first arithmetic means 17 is 44.1 kHz, the sampling frequency of the second arithmetic means 18 is 7.35 kHz, one-sixth of 44.1 kHz. Needless to say, the same sampling frequency may be used.

Figure 5:
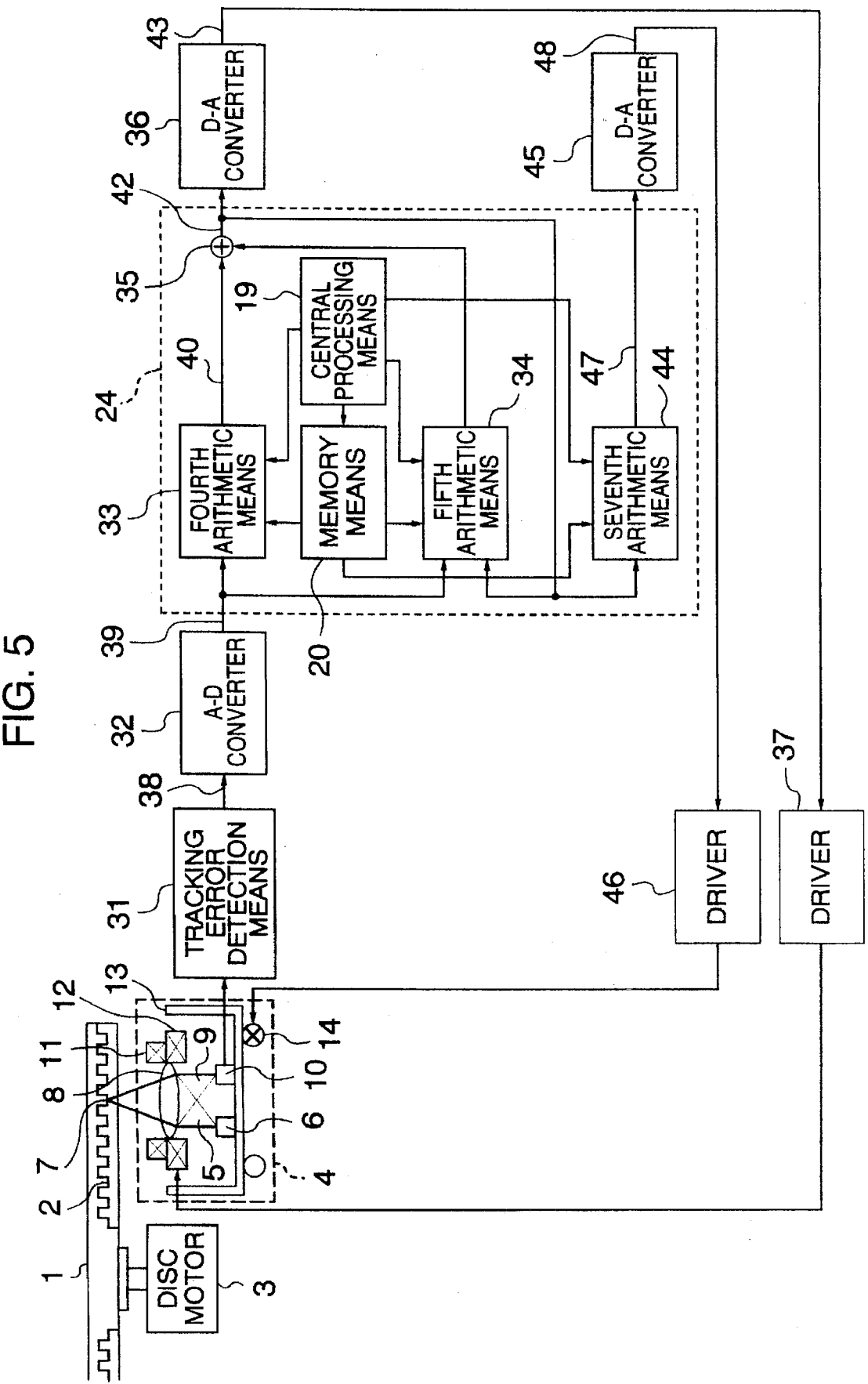
FIG. 5 is a block diagram showing the positioning system of the optical disc apparatus shown according to another embodiment of the present invention.

Description will next be made of the positioning system of the optical disc apparatus according to another embodiment of the present invention. FIG. 5 is a schematic block diagram showing the positioning system of the optical disc apparatus according to another embodiment of the present invention. This embodiment will be described centering around different portions from the embodiment shown in FIG. 1.

The positioning system of the optical disc apparatus includes a tracking error detection means 31, an A-D converter 32, a fourth arithmetic means 33 for arithmetic operation at a sampling period $T_3$, a fifth arithmetic means 34 for arithmetic operation at a sampling period $T_4$, adding means 35, a D-A converter 36, a driver 37, a seventh arithmetic means 44, a D-A converter 45 and a driver 46.

The operation of this embodiment will be described. The optical disc 1 is rotated by a disc motor 3 in such a way that the linear velocity is constant. The tracking error detection means 31 detects a tracking error signal 38 as an off-track error of the light spot 7 relative to the track 2 on the optical disc 1.

This tracking error signal 38 is input to the A-D converter 32 which outputs a digital tracking error signal 39 converted from the analog tracking error signal. This tracking error signal 39 is input to the fourth arithmetic means 33 and also to the fifth arithmetic means 34.

In response to a command from the central processing means 19, the fourth arithmetic means 33 has software read thereinto from the memory means 20, and at every sampling period $T_3$ receives a tracking error signal 39 performs a phase compensation operation such as phase-lead-lag compensation or a state feedback compensation operation involving a state estimator, and outputs the result of this operation as a fourth control signal 40. This fourth control signal 40 is input to the adding means 35.

On receiving a command from the central processing means 19, the fifth arithmetic means 34 has software read thereinto from the memory means 20, and at every sampling period $T_4$ receives a tracking error signal 39 and a sixth control signal 42, performs an operation of a disturbance observer formed by a state estimator, and outputs the result of this operation as a fifth control signal 41. This fifth control signal 41 is input to the adding means 35.

The adding means 35 receives the fourth control signal 40 and the fifth control signal 41, and adds those control signals together, and outputs the result of addition as a sixth control signal 42. This sixth control signal 42 is input to the fifth arithmetic means 34, the D-A converter 36, and the seventh arithmetic means 44.

The D-A converter 36 receives the sixth control signal 42, and outputs a sixth control signal 43 in analog form converted from the digital sixth control signal. This sixth control signal 43 is input to the driver 37.

The seventh arithmetic means 44, at every sampling period $T_3$ or $T_4$, receives a sixth control signal 42, performs an operation to correct a shift of the objective lens 7 from a mechanical neutral point corresponding to the balance of the spring of the objective lens 7 against the sled 13, and outputs the result of this operation as a seventh control signal 47. This seventh control signal 47 is input to the D-A converter 45.

The D-A converter 45 receives a seventh control signal 47, and outputs a seventh control signal 48 in analog form converted from the digital seventh control signal. This seventh control signal 48 is input to the driver 46. The driver 37 receives a sixth control signal 43, while the driver 46 receives a seventh control signal 48. The objective lens 8 is moved substantially in a radial direction by the tracking actuator 12 and the sled 13 so that the pickup is positioned in such a way that the track 2 of the optical disc 1 is followed up by the objective lens 8.

The fourth arithmetic means 33 and the fifth arithmetic means 34 in this embodiment can perform the same operations by using Eqs. 1, 2, 3, 4, 5, 6 and 7 if in the first embodiment the focus error signal 26, the first control signal 27, the second control signal 28 and the third control signal 29 are respectively replaced by the tracking error signal 39, the fourth control signal 40, the fifth control signal 41 and the sixth control signal 42, and therefore their descriptions are omitted here. The effects of this embodiment are the same as in the first embodiment, and they are not described. In the following description, the fourth control signal 40, the fifth control signal 41, the sixth control signal 42 and the seventh control signal 47 are designated by $U_4(k)$, $U_5(k)$, $U_6(k)$ and $U_7(k)$, respectively.

The seventh arithmetic means 4 will be described. The seventh arithmetic means may be of any method so long as it can correct the shift of the objective lens 7 from the mechanical neutral point corresponding to the balance of the spring of the objective lens 7 against the sled 13. This embodiment adopts compensation using a low-pass filter. The discrete-time transfer function of the seventh arithmetic means 44 at this time is expressed by the following Eq. 11.

$$C_7(z) = K_{7c} \cdot \frac{b_{71} + b_{72}z^{-1}}{1 + a_{72}z^{-1}} \quad (11)$$

where $a_{72}$, $b_{71}$ and $b_{72}$ denote coefficients representing frequency characteristics of the seventh arithmetic means 44, $K_{7C}$ denotes the loop gain of the seventh arithmetic means 44.

The seventh arithmetic means 44 receives a sixth control signal $U_6(k)$, and outputs the result of digital compensation operation as a seventh control signal $U_7(k)$ at every sampling period $T_3$ or $T_4$. An output equation to obtain a seventh control signal $U_7(k)$ from a sixth control signal $U_6(k)$ is shown below as Eq. 12.

$$\left.\begin{array}{l}W_{72}(k) = b_{71} \cdot U_6(k) + W_{71}(k) \\ U_7(k) = K_{7c} \cdot W_{72}(k)\end{array}\right\} \quad (12)$$

From Eq. 12, a seventh control signal $U_7(k)$ can be obtained, but to obtain a seventh control signal $U_7(k)$ also for the next sample, a state variable is calculated from Eq. 13.

$$W_{71}(k+1) = b_{72} \cdot U_6(k) - a_{72} \cdot W_{72}(k) \quad (13)$$

Figure 6:
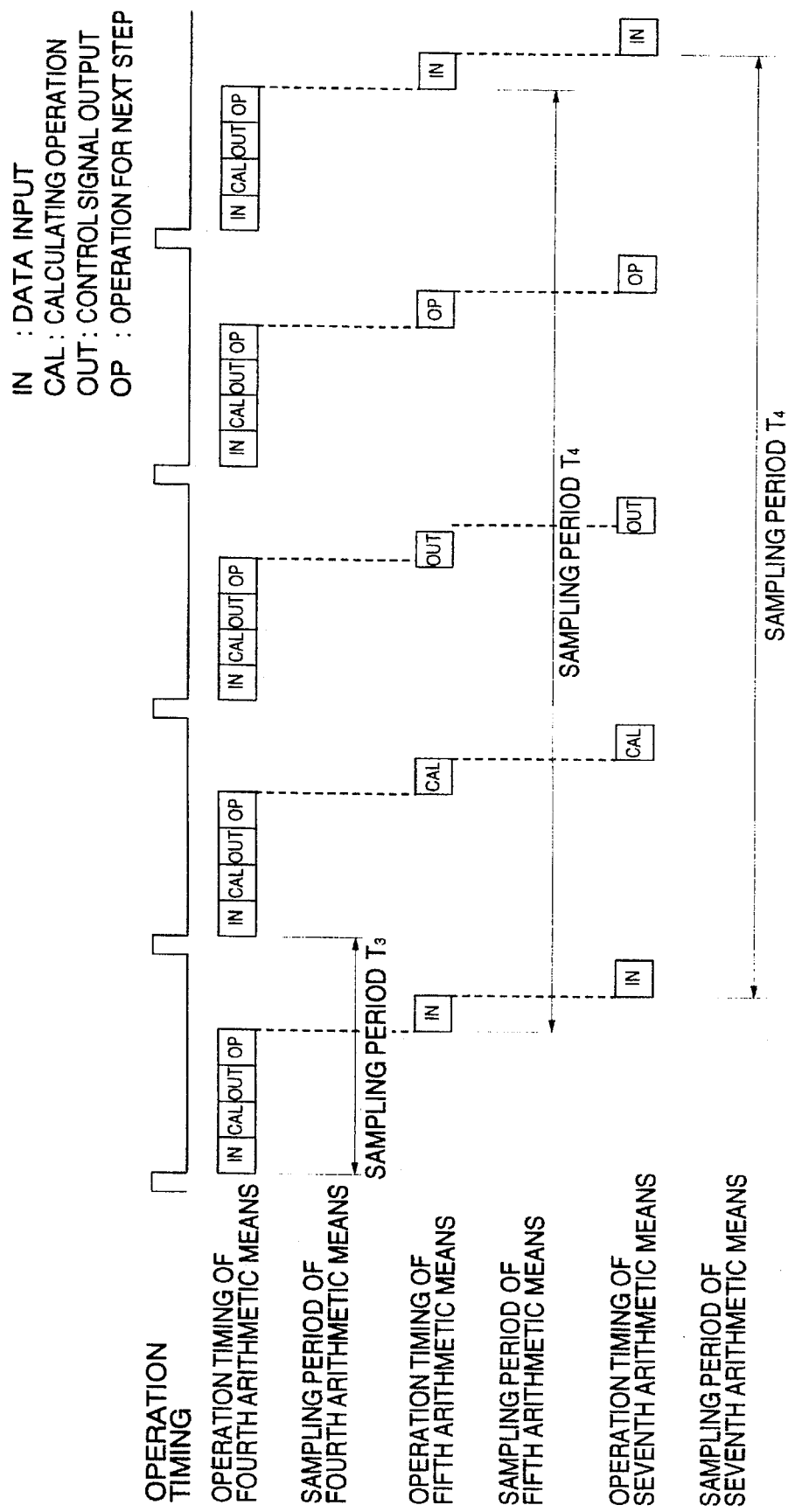
FIG. 6 is a timing chart showing operation timing of the positioning system of the optical disc apparatus.

The operation routine described above will now be explained with reference to a timing chart showing an example of the operation routines of the fourth arithmetic means 33, the fifth arithmetic means 34 and the seventh arithmetic means 44 shown in FIG. 6.

The fourth arithmetic means 33, the fifth arithmetic means 34 and the seventh arithmetic means 44 can be respectively divided into four blocks, namely, data input, arithmetic operation, control signal output, and operation for the next step.

The fourth arithmetic means 33 performs the four operations as a series of steps according to operation timing pulses produced by the central processing means 19. In contrast, the fifth srithmetic means 34 divides the four operations and performs one or an arbitrary number of the divided operations within the same operation timing after the fourth arithmetic means 33 finishes the operations.

The fifth control signal 41 is held by the adding means 35 after it is output until the next fifth control signal 41 is output. The sixth control signal 42 is included in the operations of the fourth control signal 40, and is obtained by adding a fifth control signal 41 to the fourth control signal 40.

The seventh arithmetic means 44 may be included in the operations of either the fourth arithmetic means 33 or the fifth arithmetic means 34. In this embodiment, the seventh arithmetic means 44 is included in the operations of the fifth arithmetic means 34. At this time, the seventh arithmetic means 44 divides the four operations and performs one or an arbitrary number of the divided operations after the fifth arithmetic means 34 has finished the divided operations. The seventh control signal 47 is helf after it is output until the next control signal 47 is output.

Figure 7:
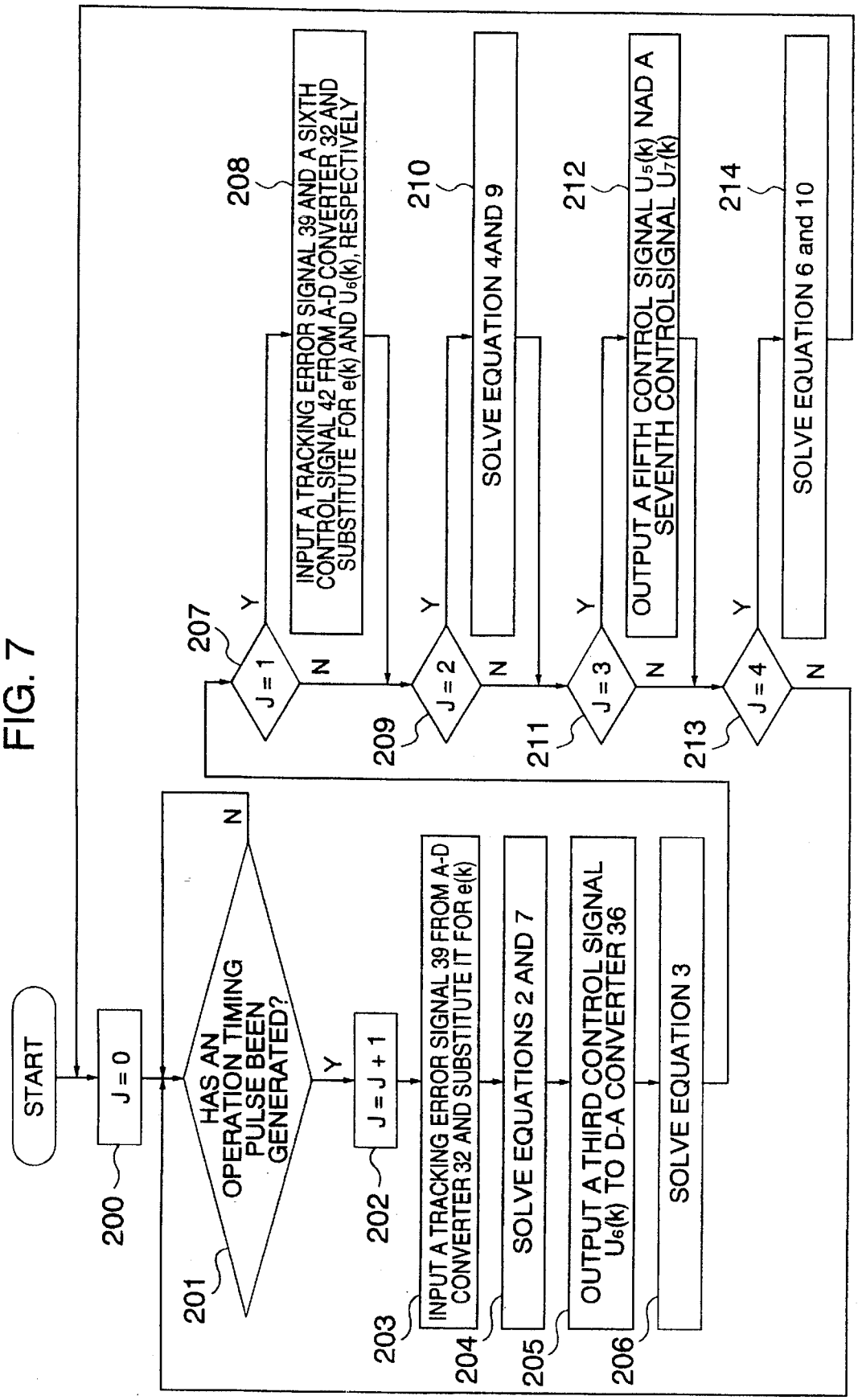
FIG. 7 is a flowchart showing an operation routine of the positioning system of the optical disc apparatus shown in FIG. 5.

The operation routine described above will be further explained with reference to a flowchart in FIG. 7 showing an example of the operation routine of the fourth arithmetic means 33, the fifth arithmetic means 34, and the seventh arithmetic means 44.

A decision is made whether or not an operation timing pulse is generated by the central processing means 19 (S201). If an operation timing pulse has not been generated, the routine waits until an operation timing pulse is generated. If an operation timing pulse has been generated, a tracking error signal 39 output from the A-D converter 32 is entered into the digital signal processing section and is substituted for e(k).

Then, Eqs. 2 and 7 as the output equations are calculated (S204), a sixth control signal $U_6(k)$ as the calculation result of Eq. 7 is output to the D-A converter 36 (S205). After this, Eq. 3 as a state equation is calculated (S206).

Then, if J=1 (S207), a tracking error signal 39 and a sixth control signal are entered from the A-D converter 32 into the digital signal processing section and substituted for e(k) and $U_6(k)$, respectively, and the routine waits for an operation timing pulse to be generated.

If J=2 (S209), Eqs. 4 and 12 as the output equations are calculated (S210), and the routine waits for an operation timing pulse to be generated. If J=3, a fifth control signal $U_5(k)$ as the operation result of Eq. 4 and a seventh control signal $U_7(k)$ as the operation result of Eq. 12 are output (S212), the routine waits for an operation timing pulse to be generated. If J=4, Eqs. 6 and 13 as state equations are calculated (S214) for the next sample, and the routine returns to step 200 and the steps mentioned above are repeated.

Referring to FIG. 5, description will next be made of a method of converting the sampling period of a digital signal by software. An analog tracking error signal 38, after passed through a low-pass filter to eliminate liasing noise (not shown), is converted by the A-D converter to a digital tracking error signal 39 synchronized with the sampling period $T_3$ of the fourth arithmetic means 33. A sixth control signal 42 is also a digital signal synchronized with the sampling period $T_3$. If the sampling period $T_4$ of the fifth arithmetic means 34 differs from the sampling period $T_3$ of the fourth arithmetic means 33, the tracking error signal 39 and the sixth control signal 42 synchronized with the sampling period $T_3$ need to be converted to digital signals synchronized with the sampling period $T_4$ of the fifth arithmetic means 34. To this end, it is necessary to perform a thinning-out process to sample at every sampling period $T_4$ a piece each of the signals of the sampling period $T_3$ when the sampling period $T_4$ is longer than the sampling period $T_3$. For this purpose, a thinning-out method in general use in digital signal processing may be used. If the sampling period $T_4$ is shorter than the sampling period $T_3$, it is necessary to perform an interpolation process. In this interpolation, an interpolation method used widely in digital signal processing may be used. When a digital fifth control signal 41 synchronized with the sampling period $T_4$, obtained as the result of operation in the fifth arithmetic means 34, is added to a digital fourth control signal 40 synchronized with the sampling period $T_3$, if the sampling period $T_4$ is longer than the sampling period $T_3$, the fifth control signal 41 needs to be held during the sampling period $T_4$. Or otherwise, an interpolation process is preferably performed, and an interpolation method in wide use in digital signal processing may be used. If the sampling period $T_4$ is shorter than the sampling period $T_3$, it is necessary to perform a thinning-out process to sample at every sampling period $T_3$ a piece each of the signals of the sampling period $T_4$, and in the thinning-out process, a thinning-out method in wide use in digital signal processing may be used.

Figure 11:
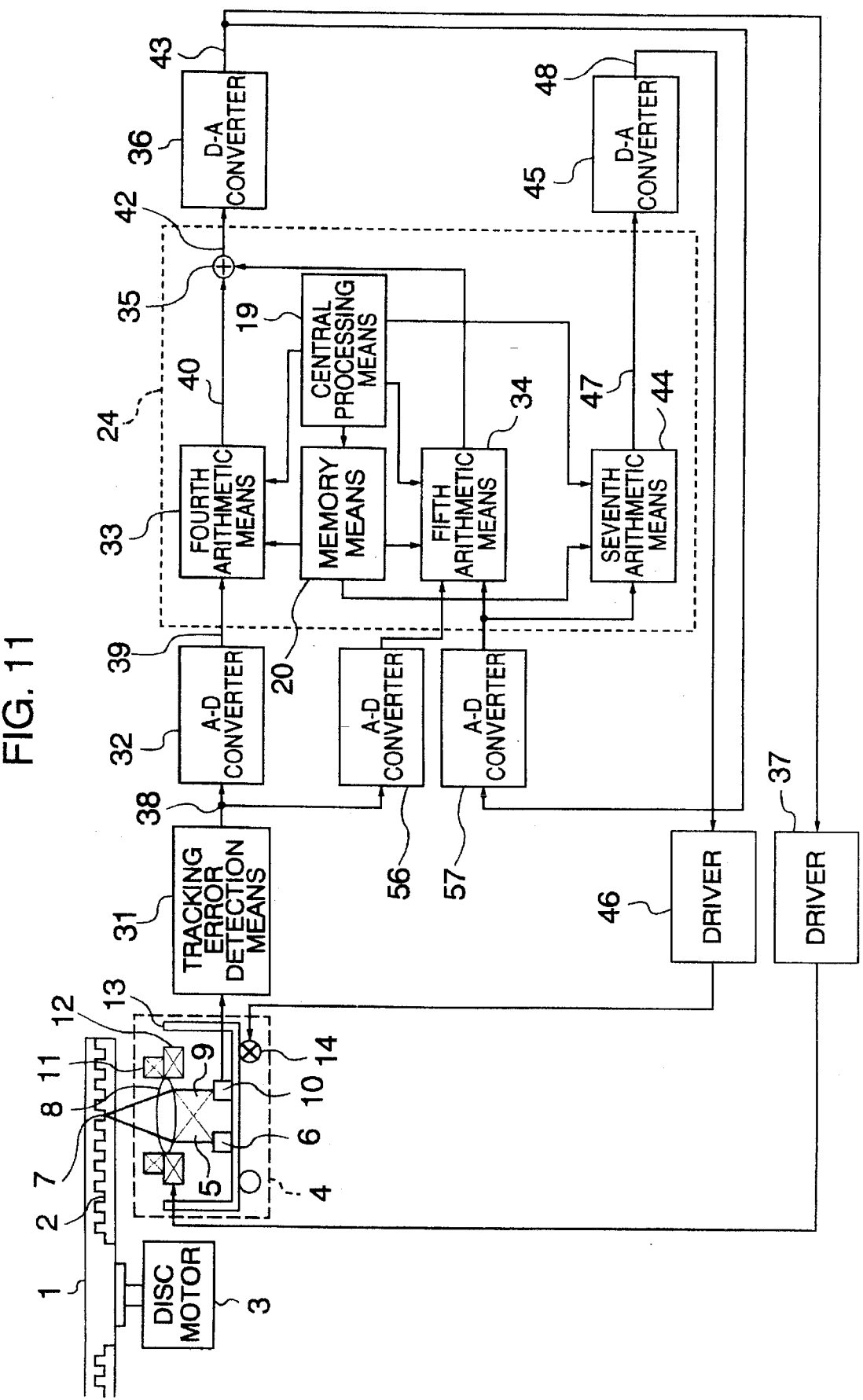
FIG. 11 is a block diagram showing yet another example of the present invention.

Next, referring to FIG. 11, description will be made of a method of converting the sampling period of a digital signal by hardware. Description will center around the portions different from the system configuration in FIG. 5. Reference numerals 56 and 57 denote A-D converters. How to convert the digital tracking error signal 39 and the digital sixth control signal 42 synchronized with the sampling period $T_3$ to digital signals synchronized with the sampling period $T_4$ is as follows. An analog tracking error signal 38, after passed through a low-pass filter to eliminate liasing noise (not shown), is converted by the A-D converter 56 to a digital synchronized with the sampling period $T_4$. A digital sixth control signal 42 synchronized with the sampling period $T_3$ is converted by the D-A converter 36 once to a sixth analog control signal 43, and the sixth analog control signal 43 is passed through a low-pass filter to eliminate liasing noise (not shown), and is converted by the A-D converter 57 to a digital signal synchronized with the sampling period $T_4$.

Description will be made of an example of the numbers of bits of the A-D and D-A converters, the number of bits used in arithmetic operations, and the value of sampling frequency, etc. in the positioning system of the optical disc apparatus. In this embodiment, the A-D converter 32, and the D-A converters 36 and 45 are of 8-bit type, and in the arithmetic operations of the fourth arithmetic means 33, the fifth arithmetic means 34 and the seventh arithmetic means 45, the coefficients of the compensation elements are 8 bits long, 8 bits×8 bits are used for multiplications, and 16 bits+16 bits are used for additions, and the memory is a 16-bit-address memory. By this arrangement, the size of the IC chip can be reduced.

As for the sampling frequency, the sampling frequency of the fourth arithmetic means 33 is 44.1 kHz, and the sampling frequency of the fifth arithmetic means 34 and the seventh arithmetic means 44 is 7.35 kHz, one-sixth of 44.1 kHz. Needless to say, the same sampling frequency may be used.

Figure 8:
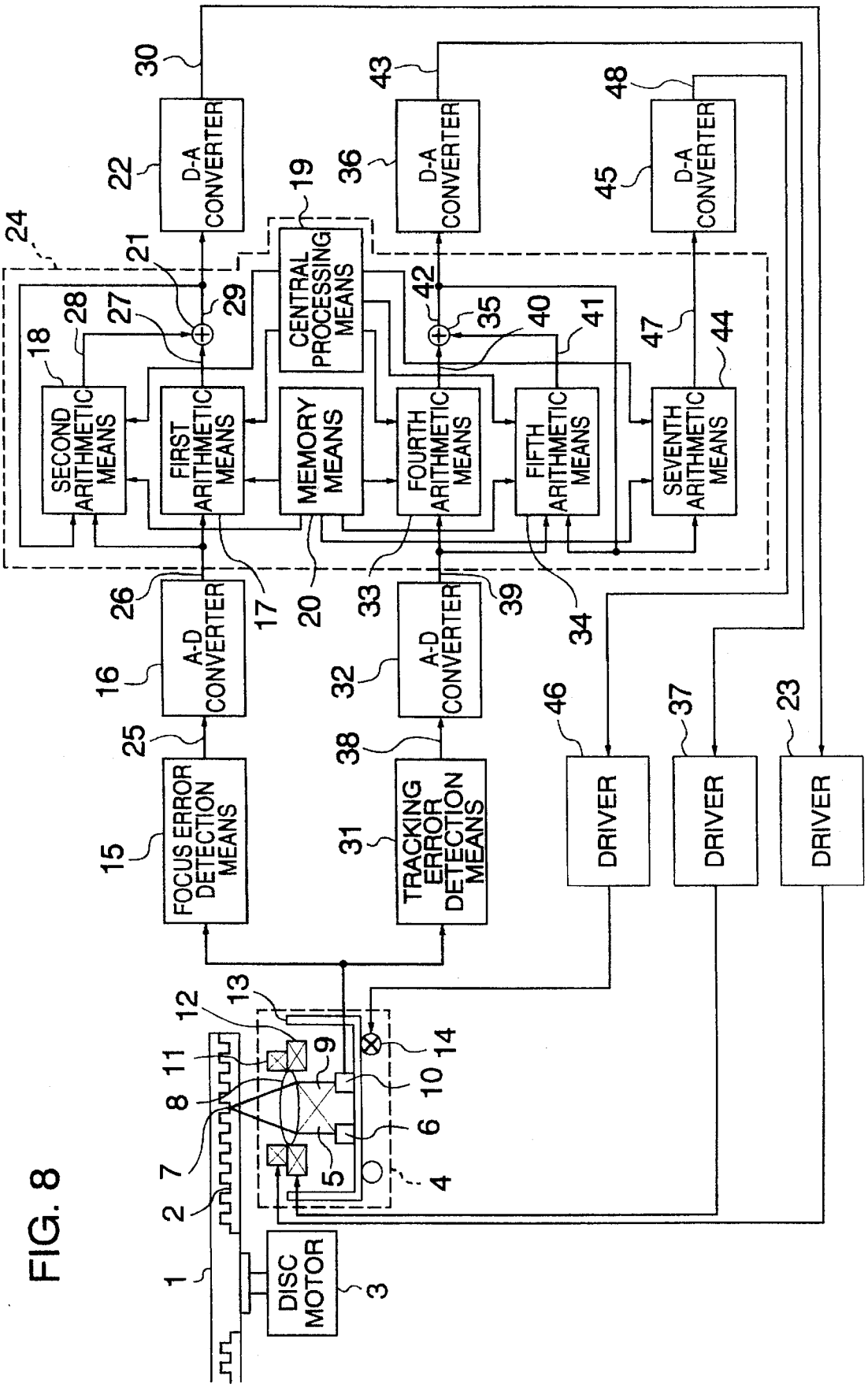
FIG. 8 is a block diagram showing the positioning system of the optical disc apparatus according to yet another embodiment of the present invention.

The positioning system of the optical disc apparatus according to yet another embodiment of the present invention will be described in the following. FIG. 8 is a schematic block diagram showing the positioning system of the optical disc apparatus according to yet another embodiment of the present invention. This embodiment illustrates the composition of the control means for a case where control arithmetic operations by the digital circuits for the focus servo means and tracking servo means, described with reference to the first and second embodiments, are performed by the same hardware.

As is easily understood from the fact that they are designated by the same reference numerals, the component parts are the same as those shown in FIGS. 1 and 5, and details of their control are the same as have been described in the first and second embodiments, and their descriptions are omitted.

With reference to FIG. 8, description will be made of a method of converting the sampling period of a digital signal by software. A analog focus error signal 25 is passed through a low-pass filter for eliminating liasing noise (not shown), and is converted by the A-D converter to a digital focus error signal 26 synchronized with the sampling period $T_1$ of the first arithmetic means 17. A third control signal 29 is a digital signal synchronized with the sampling period $T_1$. If the sampling period $T_2$ of the second arithmetic means 18 differs from the sampling period $T_1$ of the first arithmetic means 17, a focus error signal 26 and a third control signal 29 synchronized with the sampling period $T_1$ need to be converted to a digital signal synchronized with the sampling period $T_2$ of the second arithmetic means 18. If the sampling period $T_2$ is longer than the sampling period $T_1$, it is necessary to perform a thinning-out process which samples at every sampling period $T_2$ a piece each of the signals of the sampling period $T_1$. A thinning-out method in wide use in the area of digital signal processing may be performed. If the sampling period $T_2$ is shorter than the sampling period $T_1$, it is necessary to perform an interpolation process and an interpolation method in wide use in the area of digital signal processing may be used. When a digital second control signal synchronized with the sampling period $T_2$, which is the result of operation in the second arithmetic means 18 is added to the digital first control signal 27 synchronized with the sampling period $T_2$, if the sampling period $T_2$ is longer than the sampling period 1, the second control signal 28 needs to be held during the sampling period $T_2$. Or otherwise, an interpolation process is preferably performed. An interpolation method in wide use in digital signal processing may be used. If the sampling period $T_2$ is shorter than the sampling period $T_1$, it is necessary to perform a thinning-out process to sample at every sampling period $T_1$ a piece each of the respective signals of the sampling period $T_2$. A thinning-out method in wide use in digital signal processing may be used. Next, a case of the tracking error signal will be described. An analog tracking error signal 38 is passed through a low-pass filter to eliminate liasing noise (not shown), and converted by the A-D converter to a digital tracking error signal 39 synchronized with the sampling period $T_3$ of the fourth arithmetic means 33. A sixth control signal 42 is also a digital signal synchronized with the sampling period $T_3$. If the sampling period $T_4$ of the fifth arithmetic means 34 differs from the sampling period $T_3$ of the fourth arithmetic means 33, the tracking error signal 39 and the sixth control signal 42 synchronized with the sampling period $T_3$ need to be converted to digital signals synchronized with the sampling period $T_4$ of the fifth arithmetic means 34. To this end, it is necessary to perform a thinning-out process to sample at every sampling period $T_4$ a piece each of the signals of the sampling period $T_3$ when the sampling period $T_4$ is longer than the sampling period $T_3$. For this purpose, a thinning-out method in general use in digital signal processing may be used. If the sampling period $T_4$ is shorter than the sampling period $T_3$, it is necessary to perform an interpolation process. In this interpolation, an interpolation method used widely in digital signal processing may be used. When a digital fifth control signal 41 synchronized with the sampling period $T_4$, obtained as the result of operation in the fifth arithmetic means 34, is added to a digital fourth control signal 40 synchronized with the sampling period $T_3$, if the sampling period $T_4$ is longer than the sampling period $T_3$, the fifth control signal 41 needs to be held during the sampling period $T_4$. Or otherwise, an interpolation process is preferably performed, and an interpolation method in wide use in digital signal processing may be used. If the sampling period $T_4$ is shorter than the sampling period $T_3$, it is necessary to perform a thinning-out process to sample at every sampling period $T_3$ a piece each of the signals of the sampling period $T_4$, and in the thinning-out process, a thinning-out method in wide use in digital signal processing may be used.

Figure 12:
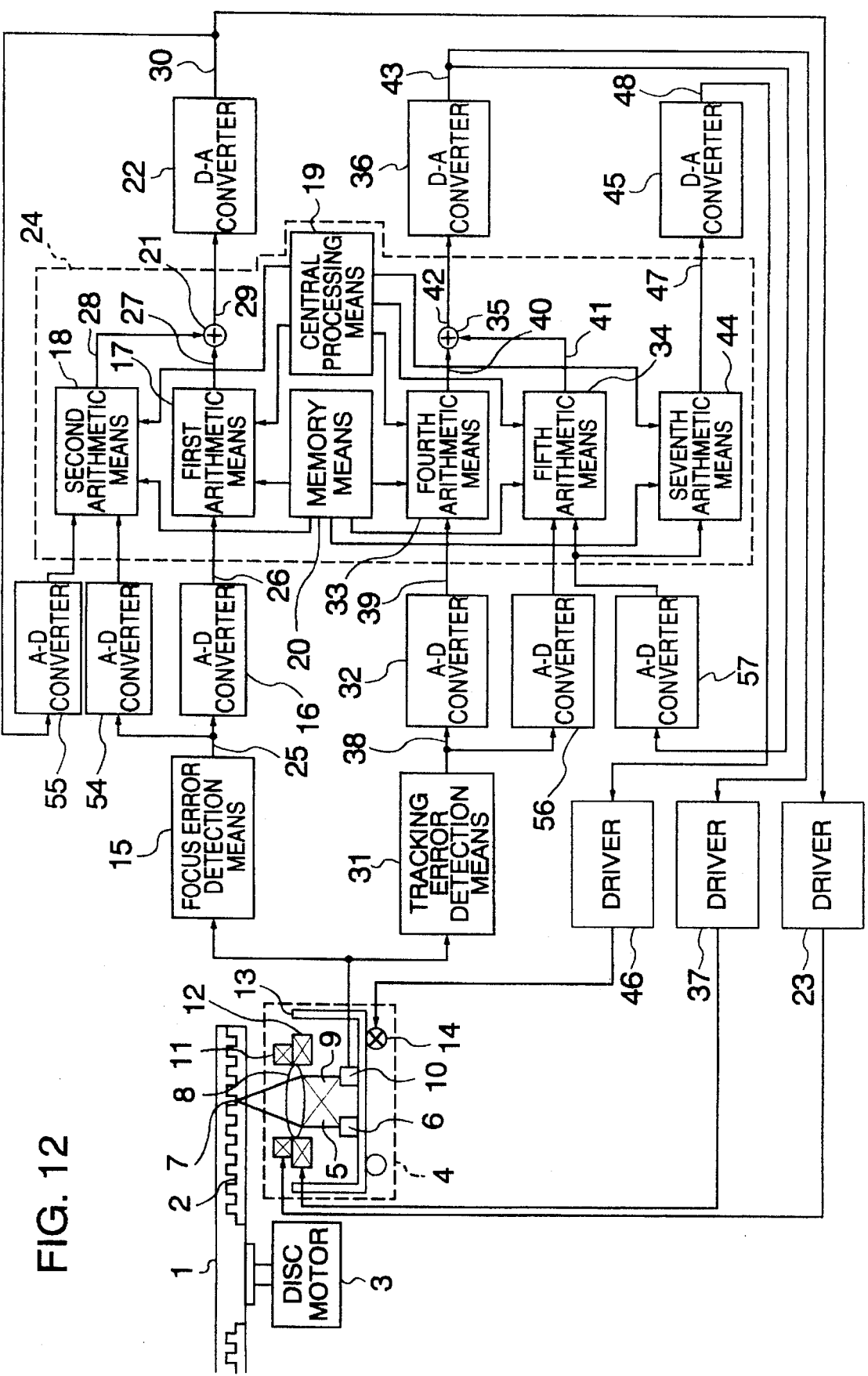
FIG. 12 is a block diagram showing further example of the present invention.

Referring to FIG. 12, description will be made of a method of converting the sampling period of a digital signal by hardware. Description will center around the portions different from the system configuration in FIG. 1. Reference numerals 54 and 55 denote A-D converters. How to convert a digital focus error signal 26 and a digital third control signal 29 synchronized with the sampling period $T_1$ to signals synchronized with the sampling period $T_2$ is as follows. With regard to the focus error signal, an analog focus error signal 25 is passed through a low-pass filter to eliminate liasing noise (not shown), and converted by the A-D converter 54 to a digital focus error signal. As for the digital third control signal 29 synchronized with the sampling period $T_1$, this third control signal 29 is converted once to an analog third control signal 30, and after passed through a low-pass filter to eliminate liasing noise (not shown), the analog third control signal 30 is converted by the A-D converter 55 to a digital signal synchronized with the sampling period $T_2$. Next, description will be made of a case of the tracking error signal. Description will center around the portions different from the system configuration in FIG. 5. Reference numerals 56 and 57 denote A-D converters. How to convert the digital tracking error signal 39 and the digital sixth control signal 42, synchronized with the sampling period $T_3$, to digital signals synchronized with the sampling period $T_4$ is as follows. An analog tracking error signal 38, after passed through a low-pass filter to eliminate liasing noise (not shown), is converted by the A-D converter 56 to a digital signal synchronized with the sampling period $T_4$. A digital sixth control signal 42 synchronized with the sampling period $T_3$ is converted by the D-A converter 36 once to a sixth analog control signal 43, and the sixth analog control signal 43 is passed through a low-pass filter to eliminate liasing noise (not shown), and is converted by the A-D converter 57 to a digital signal synchronized with the sampling period $T_4$.

Description will be made of an example of the numbers of bits of the coverters, the number of bits used in arithmetic operations and the sampling frequency, etc. In this embodiment, the A-D converter 16, the D-A converter 22, the A-D converter 32, the D-A converter 36 and the D-A converter 45 are of 8-bit type, and in the arithmetic operations of the first arithmetic means 17, the second arithmetic means 18, the fourth arithmetic means 33, the fifth arithmetic means 34 and the seventh arithmetic means 44, the coefficients of the compensation elements are 8 bits long, 8 bits×8 bits are used for multiplications and 16 bits+16 bits are used for additions, a 16-bit-address memory is used. By this arrangement, the IC chip size is reduced to 7 square kilometers or less.

With respect to the sampling frequency, the sampling frequency of the first arithmetic means 17 and the fourth arithmetic means 33 is 44.1 kHz, and the sampling frequency of the second arithmetic means 18, the fifth arithmetic means 34 and the seventh arithmetic means 44 is 7.35 kHz, one-sixth of 44.1 kHz. It goes without saying that the same sampling frequency may be used.

As has been described, according to this embodiment in which a second control signal or a fifth control signal representing disturbance estimated by the second arithmetic means or the fifth arithmetic means is added to a first control signal or a fourth control signal, and in which those arithmetic means are formed as digital circuits, it is possible to provide a positioning system of an optical disc apparatus capable of reducing the circuit configuration, obtaining improved disturbance suppression characteristics for high-speed data transmission, and automating adjustment of the servo system.

Further, in view of the fact that the frequency of the disc surface vertical deflection or eccentricity of is low, the operation of the second arithmetic means or the fifth arithmetic means is performed at a sampling frequency the same as or lower than the operation of the first arithemtic means or the fourth arithmetic means, so that the disturbance suppression characteristics can be improved still more, and the automation of servo system adjustment can be pushed forward.

Further, by using integer multiples of or one divided by an integer by the sampling frequency of the optical disc apparatus, it becomes possible to use a single standard clock for the optical disc apparatus, so that the circuit can be simplified.

Further, the composition of this embodiment can be applied adequately to the positioning system of DVD.

We claim:

1. A positioning system of an optical disc apparatus according to present invention comprising:

focus error detecting means for detecting a focus error signal as a focal shift of a light spot relative to an information recording surface of an optical disc;

means for moving the light spot in the direction intersecting substantially perpendicularly to said optical disc surface;

first digital arithmetic means for receiving said focus error signal and outputting a first control signal;

second digital arithmetic means for receiving said focus error signal and a specified third control signal, performing arithmetic operations of a disturbance observer and outputting a second control signal;

adding means for adding said first control signal and said second control signal and outputting said third control signal; and drive means for driving said light spot moving means in a direction intersecting perpendicularly to the disc surface by said third control signal, wherein said first and the second digital arithmetic means perform arithmetic operations at different sampling periods.

2. A positioning system of an optical disc apparatus according to claim 1, further comprising first and second A-D converters each for converting said focus error signal in analog form detected by said focus error detection means to a digital focus error signal, wherein said focus error signal converted to a digital signal by said first A-D converter is input to said first digital arithmetic means and said focus error signal converted to a digital signal by said second A-D converter is input to said second digital arithmetic means; a D-A converter for converting said third control signal in digital form to an analog signal; and a third A-D converter for converting said third control signal converted to an analog signal back to a digital signal, wherein a signal converted by said third A-D converter to a digital signal is input to said second digital arithmetic means.

3. A positioning system of an optical disc apparatus according to claim 1, wherein the sampling period of said second digital arithmetic means is longer than the sampling period of said first digital arithmetic means.

4. A positioning system of an optical disc apparatus according to claim 3, wherein the sampling period of said second digital arithmetic means is integer multiples of the sampling period of said first digital arithmetic means.

5. A positioning system of an optical disc apparatus according to claim 4, wherein the second digital arithmetic means is formed by a combination of a low-pass filter and a high-pass filter.

6. A positioning system of an optical disc apparatus according to the present invention comprising:

tracking error detection means for detecting a tracking error signal as an off-track error of a light spot tracing the track on the optical disc;

light spot radially moving means for moving the light spot substantially in the radial direction of the optical disc;

fourth digital arithmetic means for receiving said tracking error signal and outputting a fourth control signal;

fifth digital arithmetic means for receiving said tracking error signal and a sixth control signal, performing arithmetic operations of a disturbance observer and outputting a fifth control signal;

adding means for adding said fourth control signal and said fifth control signal and outputting said sixth control signal;

seventh digital arithmetic means for receiving the sixth control signal and outputting a seventh control signal; and radially drive means for driving the light spot radially moving means by the sixth control signal and the seventh control signal, wherein said fourth digital arithmetic means and said fifth digital arithmetic means perform arithmetic operations at different sampling periods.

7. A positioning system of an optical disc apparatus according to claim 6, further comprising fourth and fifth A-D converters each for converting said tracking error signal in analog form detected by said tracking error detection means to a digital signal, wherein said tracking error signal converted to a digital signal by said fourth A-D converter is input to said fourth digital arithmetic means and said tracking error signal converted to a digital signal by said fifth A-D converter is input to said fifth digital arithmetic means; a D-A converter for converting said sixth control signal in digital form to an analog signal; and a sixth A-D converter for converting said sixth control signal converted to an analog signal back to a digital signal, wherein a signal converted to a digital signal by said sixth A-D converter is input to said fifth digital arithmetic means.

8. A positioning system of an optical disc apparatus according to claim 6, wherein the sampling period of said fifth digital arithmetic means is longer than the sampling period of said fourth digital arithmetic means.

9. A positioning system of an optical disc apparatus according to claim 8, wherein the sampling period of said fifth digital arithmetic means is integer multiples of the sampling period of said fourth digital arithmetic means.

10. A positioning system of an optical disc apparatus according to claim 9, wherein said fifth digital arithmetic means is formed by a combination of a low-pass filter and a high-pass filter.

11. A positioning system of an optical disc apparatus according to the present invention comprising:

focus error detection means and tracking error detection means for respectively detecting a focus error signal as a focal shift of a light spot relative to an information recording surface of an optical disc and an off-track error of the light spot tracing the track on the optical disc;

light spot moving means for moving the light spot in a direction intersecting substantially perpendicularly to the optical disc surface and light spot radially moving means for moving the light spot substantially in the radial direction of the optical disc surface;

first digital arithmetic means for receiving the focus error signal and outputting a first control signal;

second digital arithmetic means for receiving said focus error signal and a third control signal, performing arithmetic operations of a disturbance observer and outputting a second control signal;

first adding means for adding said first control signal and said second control signal and outputting said third control signal;

drive means for driving the light spot moving means in a direction intersecting perpendicularly to the disc surface by said third control signal;

fourth digital arithmetic means for receiving said tracking error signal and outputting a fourth control signal;

fifth digital arithmetic means for receiving said tracking error signal and a sixth control signal and outputting a fifth control signal;

second adding means for adding said fourth control signal and said fifth control signal and outputting said sixth control signal;

seventh digital arithmetic means for receiving said sixth control signal and outputting a seventh control signal; and radially driving means for driving the light spot radially moving means by the sixth control signal and the seventh control signal, wherein said first and second digital arithmetic means perform arithmetic operations respectively at different sampling periods, and said fourth and fifth digital arithmetic means perform arithmetic operations at different sampling periods.

12. A positioning system of an optical disc apparatus according to claim 11, further comprising first and second A-D converters each for converting said focus error signal in analog form detected by said focus error detection means to a digital focus error signal, wherein said focus error signal converted to a digital signal by said first A-D converter is input to said first digital arithmetic means and said focus error signal converted to a digital signal by said second A-D converter is input to said second digital arithmetic means; a D-A converter for converting said third control signal in digital form to an analog signal; a third A-D converter for converting said third control signal converted to an analog form back to a digital signal, wherein a signal converted by said third A-D converter to a digital signal is input to said second digital arithmetic means; fourth and fifth A-D converters each for converting said tracking error signal in analog form detected by said tracking error detection means to a digital signal, wherein said tracking error signal converted to a digital signal by said fourth A-D converter is input to said fourth digital arithmetic means and said tracking error signal converted to a digital signal by said fifth A-D converter is input to said fifth digital arithmetic means; a D-A converter for converting said sixth control signal in digital form to an analog signal; and a sixth A-D converter for converting said sixth control signal converted to an analog signal back to a digital signal, wherein a signal converted to a digital signal by said sixth A-D converter is input to said fifth digital arithmetic means.

13. A positioning system of an optical disc apparatus according to claim 11, wherein the sampling period of said second digital arithmetic means is longer than the sampling period of said first digital arithmetic means, and the sampling period of said fifth digital arithmetic means is longer than the sampling period of said fourth digital arithmetic means.

14. A positioning system of an optical disc apparatus according to claim 13, wherein the sampling period of said second digital arithmetic means is integer multiples of the sampling period of said first digital arithmetic means, and the sampling period of said fifth digital arithmetic means is integer multiples of the sampling period of said fourth digital arithmetic means.

15. A positioning system of an optical disc apparatus according to claim 14, wherein said second and fifth arithmetic means each comprise a combination of a low-pass filter and a high-pass filter.

16. A positioning system of an optical disc apparatus according to any of claims 1, 6 and 11, wherein the sampling frequency of each said digital arithmetic circuit is integer multiples or one divided by an integer of the sampling frequency of the optical disc apparatus.

17. A positioning system of an optical disc apparatus according to any of claims 1, 6 and 11, wherein the sampling frequency of each said digital arithmetic circuit is integer multiples or one divided by an integer of 44.1 kHz.

18. A positioning system of an optical disc apparatus according to any of claims 1, 6 and 11, wherein said digital circuits are integrated into one circuit.

19. A positioning system of an optical disc apparatus according to any of claims 1, 6 and 11, wherein said digital circuits are by an IC chip.

20. A positioning system of an optical disc apparatus according to claim 19, wherein the area of said IC chip is seven square millimeters or less.

* * * * *